(12) United States Patent
Brotto et al.

(10) Patent No.: US 6,218,806 B1
(45) Date of Patent: Apr. 17, 2001

(54) METHOD AND APPARATUS FOR OBTAINING PRODUCT USE INFORMATION

(75) Inventors: Daniele Brotto, Baltimore, MD (US); Darnell Smith, York, PA (US); Danh Trinh, Towson, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/292,165

(22) Filed: Apr. 15, 1999

Related U.S. Application Data

(60) Provisional application No. 60/089,066, filed on Jun. 12, 1998, and provisional application No. 60/087,896, filed on Jun. 3, 1998.

(51) Int. Cl.$^7$ .................................................. H02J 7/00
(52) U.S. Cl. ........................................ 320/106; 320/127
(58) Field of Search ................................. 320/106, 110, 320/132, 149

(56) References Cited

U.S. PATENT DOCUMENTS

| | | | |
|---|---|---|---|
| 4,455,523 | 6/1984 | Koenck | 320/131 |
| 4,553,081 | 11/1985 | Koenck | 320/131 |
| 4,709,202 | * 11/1987 | Koenck et al. | 320/112 |
| 4,716,354 | 12/1987 | Hacker | 320/114 |
| 4,737,702 | 4/1988 | Koenck | 320/114 |
| 4,845,419 | 7/1989 | Hacker | 320/136 |
| 4,885,523 | 12/1989 | Koenck | 320/131 |
| 4,961,043 | 10/1990 | Koenck | 320/132 |
| 5,057,383 | 10/1991 | Sokira | 429/92 |
| 5,136,620 | 8/1992 | Eaves | 377/15 |
| 5,278,487 | 1/1994 | Koenck | 320/132 |
| 5,284,719 | 2/1994 | Landau et al. | 429/50 |
| 5,290,191 | 3/1994 | Foreman et al. | 439/225 |
| 5,341,503 | * 8/1994 | Gladstein et al. | 320/106 |
| 5,349,535 | 9/1994 | Gupta | 702/63 |
| 5,360,967 | 11/1994 | Perkin et al. | 235/575 |
| 5,425,375 | 6/1995 | Chin et al. | 600/549 |
| 5,438,248 | 8/1995 | Hyuck | 320/106 |
| 5,459,671 | 10/1995 | Duley | 702/63 |
| 5,463,305 | 10/1995 | Koenck | 320/145 |
| 5,508,599 | 4/1996 | Koenck | 320/138 |
| 5,525,890 | 6/1996 | Iwatsu et al. | 320/106 |
| 5,534,765 | 7/1996 | Kreisinger et al. | 320/106 |
| 5,541,489 | 7/1996 | Dunstan | 320/134 |
| 5,546,317 | * 8/1996 | Andrieu | 726/63 |
| 5,563,494 | 10/1996 | Cuesta | 320/150 |
| 5,565,759 | 10/1996 | Dunstan | 320/135 |
| 5,572,110 | 11/1996 | Dunstan | 320/106 |
| 5,590,058 | 12/1996 | Foreman et al. | 702/63 |
| 5,592,069 | 1/1997 | Dias et al. | 320/106 |
| 5,600,230 | 2/1997 | Dunstan | 340/636 |
| 5,608,306 | 3/1997 | Rybeck et al. | 320/106 |
| 5,619,117 | 4/1997 | Koenck | 320/106 |
| 5,635,813 | 6/1997 | Shiga et al. | 320/106 |

(List continued on next page.)

OTHER PUBLICATIONS

Academic Press Dictionary of Science and Technology, Academic Press, Inc., p. 1805, 1992.*

*Primary Examiner*—Peter S. Wong
*Assistant Examiner*—Pia Tibbits
(74) *Attorney, Agent, or Firm*—Adan Ayala

(57) ABSTRACT

A charging apparatus for charging a battery comprising a current source for providing current to the battery, a controller connected to the battery and to the current source for controlling charging of the battery, and a memory connected to the controller for storing information about the battery. The memory may also store information about the charging apparatus. Preferably, the memory is a non-volatile memory, such as E$^2$PROM. Also disclosed are a battery having a memory for storing information, a power tool having a memory for storing information about the tool, and a reading apparatus for reading the information stored in the memory of the charger, battery and/or power tool.

24 Claims, 2 Drawing Sheets

U.S. PATENT DOCUMENTS

| | | | | |
|---|---|---|---|---|
| 5,654,623 | * | 8/1997 | Shiga et al. | 320/106 |
| 5,694,019 | * | 12/1997 | Uchida et al. | 320/106 |
| 5,694,024 | | 12/1997 | Dias | 320/106 |
| 5,717,307 | * | 2/1998 | Barkat et al. | 320/106 |
| 5,917,305 | * | 6/1999 | Faulk | 320/106 |
| 5,982,147 | * | 11/1999 | Anderson | 320/130 |
| 6,002,240 | * | 12/1999 | McMahan et al. | 320/150 |
| 6,005,367 | * | 12/1999 | Rohde | 320/106 |
| 6,016,047 | * | 1/2000 | Notten et al. | 320/137 |
| 6,021,332 | * | 2/2000 | Alberth, Jr. et al. | 320/111 |
| 6,025,699 | * | 2/2000 | Cummings | 320/136 |

* cited by examiner

METHOD AND APPARATUS FOR OBTAINING PRODUCT USE INFORMATION

CROSS-REFERENCE TO RELATED APPLICATIONS

The present application is based upon and claims priority under 35 USC §119 and 37 CFR §1.78 of U.S. provisional applications Ser. No. 60/089,066, filed on Jun. 12, 1998, and Ser. No. 60/087,896, filed on Jun. 3, 1998.

FIELD OF THE INVENTION

This invention relates generally to a method and apparatus for obtaining product use information and more particularly, for obtaining use information of components included in a rechargeable battery system.

BACKGROUND OF THE INVENTION

Rechargeable battery systems include three main components: (1) a rechargeable battery or battery pack; (2) a charger for charging the battery; and (3) a device powered by the battery, such as portable power tools and certain kitchen and domestic appliances. Knowledge of how a user actually uses and interacts with each component can provide useful insights, which can in turn be implemented in future product designs.

Typically, such information is derived from actual interviews with users, either individually or in groups. However, the information derived from these interviews is usually information relating to the user's perception of his use patterns, which are often subjective and inaccurate.

It is thus an object of the invention to provide a method and apparatus for obtaining actual product use information.

SUMMARY OF THE INVENTION

In accordance with the present invention, a charging apparatus for charging a battery comprising a current source for providing current to the battery, a controller connected to the battery and to the current source for controlling charging of the battery, and a memory connected to the controller for storing information about the battery. The memory may also store information about the charging apparatus. Preferably, the memory is a non-volatile memory, such as E²PROM.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

The invention is now described with reference to the accompanying figures, wherein like numerals designate like parts. All the teachings of the Saar U.S. Pat. Nos. 4,388,582 and 4,392,101 are hereby incorporated by reference into this specification.

Figure 1:
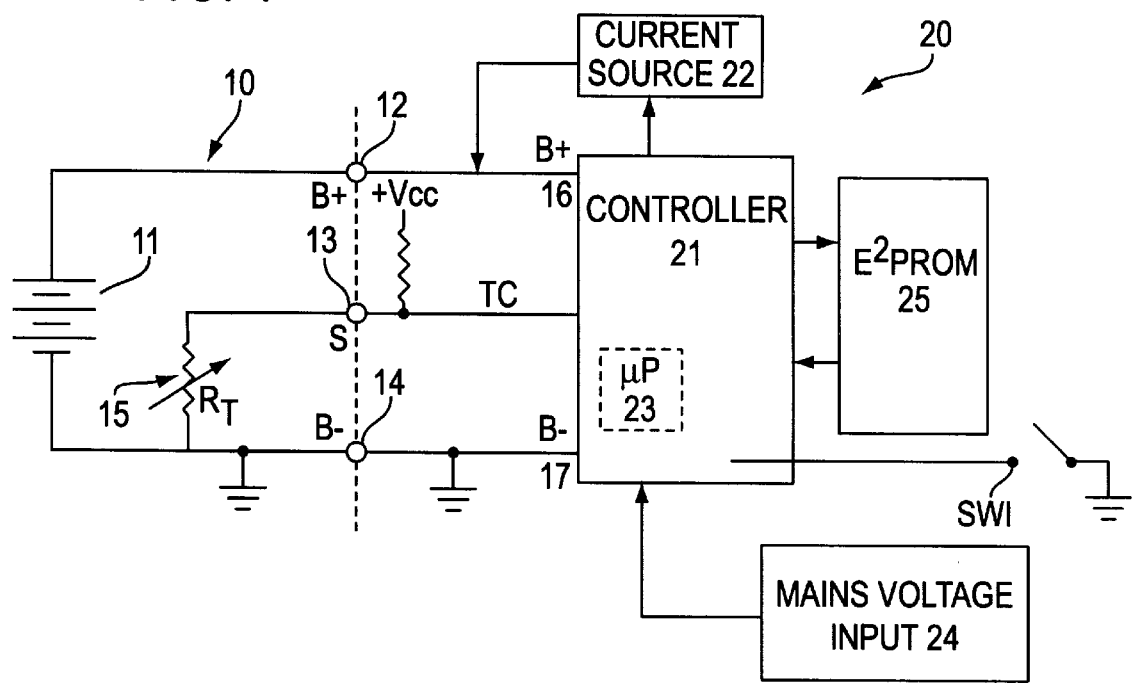
FIG. 1 is a circuit schematic diagram of a battery charger according to the present invention.

Referring to FIG. 1, a battery 10 is connected to a charger 20. Battery 10 comprises a plurality of battery cells 11 connected in series, which dictate the voltage and storage capacity for battery 10. Battery 10 includes three battery contacts: first battery contact 12, second battery contact 13, and third battery contact 14. Battery contact 12 is the B+ (positive) terminal for battery 10. Battery contact 14 is the B− or negative/common terminal. Battery contact 13 is the S or sensing terminal. Battery contacts 12 and 14 receive the charging current sent from the charger 20 (preferably from current source 22, as discussed below) for charging the battery 10.

As shown in FIG. 1, the battery cells 11 are connected between the battery contacts 12 and 14. In addition, preferably connected between battery contacts 13 and 14 is a temperature sensing device 15, such as a negative temperature co-efficient (NTC) resistor, or thermistor, $R_T$. The temperature sensing device is preferably in closer proximity to the cells 11 for monitoring of the battery temperature. Persons skilled in the art will recognize that other components, such as capacitors, etc., or circuits can be used to provide a signal representative of the battery temperature.

Battery 10 may also comprise an identifier as known in the prior art, so that charger 20 can identify the type and capacity of the battery, and charge accordingly.

The charger 20 preferably comprises a controller 21, which in turn includes positive terminal (B+) 16 and negative (B−) terminal 17, which are coupled to battery 10 via battery contacts 12 and 14, respectively. The positive terminal may also act as an input, preferably an analog/digital input, in order for the controller 21 to detect the battery voltage. In addition, the controller 21 may include another input TC, preferably an analog/digital input, which is coupled to the temperature sensing device 15 via the third battery contact 13 (S). This allows the controller 21 to monitor the battery temperature. Controller 21 may include a microprocessor 23 for controlling the charging and monitoring operations. Controller 21 may control a current source 22 that provides current to battery 10. This current may be a fast charging current and/or an equalization current. Current source 22 may be integrated within controller 21.

A switch SW1 may be connected to controller 21 to manually select charging processes or modes, such as a fast charging mode and a refresh mode.

A memory 25 is preferably connected to the controller 21. Preferably, the memory 25 is a non-volatile memory such as E²PROM. Accordingly, controller 21 may read and/or write in memory 25. Controller 21 may store in memory 25 information related to the battery, such as type, capacity, charging process, etc. Similarly, controller 21 may store in memory 25 information related to the charger. For example, controller 21 may store information such as number of NiCd batteries charged, number of NiMH batteries charged, number of times switch SW1 was on or activated (i.e., the number of times the refresh mode was selected), number of times the charging process was delayed to allow cooling of the battery, etc.

Preferably controller 21 can designate a string of memory slots, or "buckets," for storing related information. For example, in order to save information on initial battery temperature, a string of memory slots of memory 25 may be organized into buckets, each bucket representing a range of initial battery temperatures. Accordingly, a bucket may be designated for initial temperatures below 20° C. A second bucket may be designated for initial temperatures between 20° and 30°, and so on. Accordingly, for example, if a battery 10 with an initial temperature of 43° C. is inserted into charger 20, controller 23 would read the bucket corresponding for initial temperatures between 40° and 45°, increase the read value and store the new value in the bucket.

Similar buckets may be established for other information, such as charge termination process, i.e., number of times minus-delta-V was used to terminate charging, number of times temperature change rate was used to terminate charging, etc.

Persons skilled in the art will recognize that controller 21 may store in memory 25 any type of desired information, provided the controller 21 receives the proper input. For example, a signal 24 originating from the power supply representative of the voltage received from an outlet or generator, i.e., the mains voltage, may be received by controller 21. Controller 21 can then determine and store, for example, the number of times the mains voltage was below 90 volts or above 130 volts.

Similarly, controller 21 may also store into memory 25 the amount of time a battery 10 is connected to charger 20. Such information is useful to determine actual conditions of use, which can then be trusted in designing future chargers.

Persons skilled in the art will recognize that any information related to the battery charging process and/or charger may be stored in memory 25 so long as controller 21 receives the proper input and a large enough memory is provided.

Figure 4:
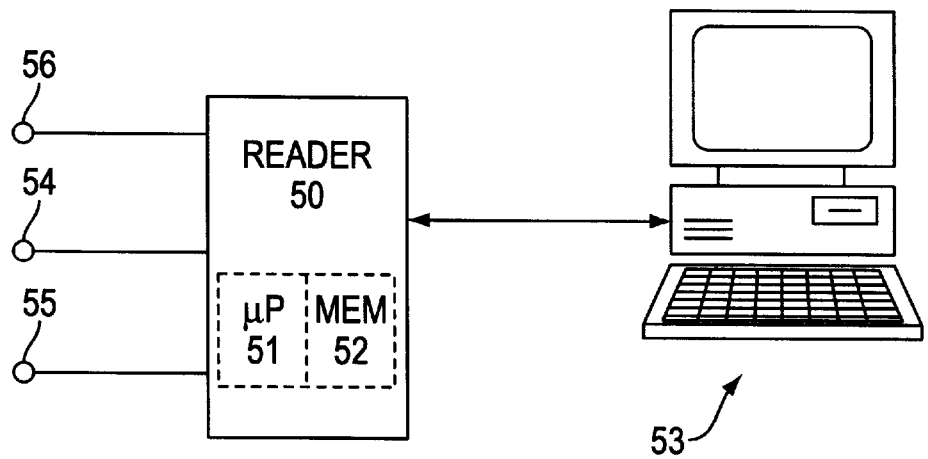
FIG. 4 is a block diagram of a data reader according to the present invention.

In order to analyze the information, it must be downloaded from charger 20. Referring now to FIGS. 1 and 4, such operation may be accomplished by connecting the charger 20 to a reader 50 and/or a computer 53. Reader 50 may have contacts 54, 55 and 56 which connect to the different terminals of charger 20. Reader 50 may also have a microprocessor 51 for controlling the communications between charger 20 and reader 50. A memory 52 may also be provided in reader 50 for storing the contents of memory 25, if so desired. This allows the analyst to download the information from charger 20, without carrying a separate computer 53, and then later downloading the contents of memory 52 into computer 53. Reader 50 may also contain enough memory to store the information downloaded from several chargers 20. Reader 50 may be connected to the serial or parallel ports of computer 53, for example.

Controller 21 has at least one line for transmitting the contents of memory 25. Preferably, this line is the TC line. Controller 21 preferably conducts a "data dump" operation, where the information of memory 25 is directly transmitted without further intervention from controller 21. Controller 21 may send the information to reader 50 after a handshaking routine between reader 50 and controller 21 is conducted. Preferably, controller 21 sends the information via the TC line according to a serial communication scheme. Reader 50 then receives the information, stores it into memory 52 and/or sends it to computer 53 for analysis.

Figure 2:
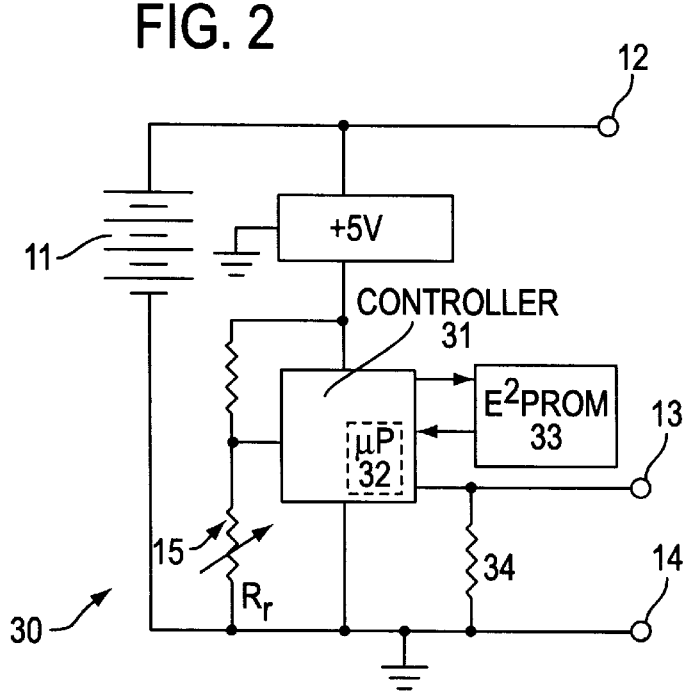
FIG. 2 is a circuit schematic diagram of a battery according to the present invention.

FIG. 2 illustrates a battery 30 according to the present invention, where like numerals represent like parts. The main difference between battery 10 and battery 30 is that battery 30 has been equipped with a controller 31, preferably connected to terminals 12, 13 and 14. Controller 31 may include a microprocessor 32 for controlling the sensing and memory operations, as discussed below.

A memory 33 is preferably connected to the controller 31. Preferably, the memory 33 is a non-volatile memory such as E$^2$PROM. Accordingly, controller 31 may read and/or write in memory 33. Controller 31 may store in memory 33 information related to the battery, such as temperature, length of charging process, etc., in a manner similar to that explained above.

A bias pull-down resistor 34 may be disposed between terminals 13 and 14.

Referring now to FIGS. 2 and 4, the information from memory 33 may be downloaded by connecting the battery 30 to a reader 50 and/or a computer 53. Reader 50 may have contacts 54, 55 and 56 which connect to the terminals 12, 13 and 14 of battery 30.

Reader 50 and controller 31 may conduct a hand-shaking routine to induce controller 31 into transmitting the information stored in memory 33. Such a routine could be as simple as pulling up the bias on the line connected to the sensing terminal 13. Controller 31 would sense the bias pull-up and proceed to transmit the information. Preferably, controller 31 conducts a data dump operation, where the information of memory 33 is directly transmitted without further intervention from controller 31. Controller 31 may send the information to reader 50 according to a serial communication scheme. Reader 50 then receives the information, stores it into memory 52 and/or sends it to computer 53 for analysis. Reader 50 may also contain enough memory to store the information downloaded from several batteries 30.

Figure 3:
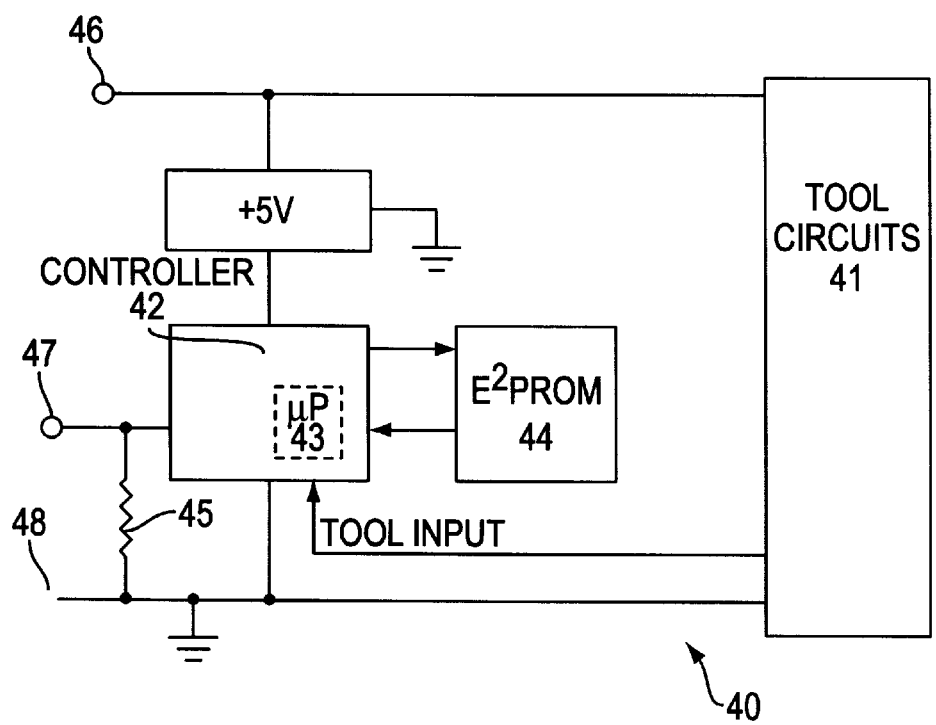
FIG. 3 is a circuit schematic diagram of a cordless tool according to the present invention.

FIG. 3 illustrates a tool 40 according to the present invention. Tool 40 comprises terminals 46 and 48 for receiving power from a battery connected thereto, and tool circuits 41 connected to terminals 46 and 48. Tool circuits 41 may include power regulation circuits, motor circuits, etc. A controller 42 is preferably connected to terminals 46 and 48. Controller 42 may include a microprocessor 43 for controlling the sensing and memory operations, as discussed below. Controller 42 may also be connected to a terminal 47 to be used for transmitting information, as discussed below. A bias pull-down resistor 45 may be disposed between terminals 47 and 48.

A memory 44 is preferably connected to the controller 42. Preferably, the memory 44 is a non-volatile memory such as E$^2$PROM. Accordingly, controller 42 may read and/or write in memory 44. Controller 42 may store in memory 44 information related to the tool 40, such as tool temperature, length of use, number of times the tool has been turned on, etc., in a manner similar to that explained above. Controller 42 receives the desired information from the tool circuits 41.

Referring now to FIGS. 3 and 4, the information from memory 33 may be downloaded by connecting the tool 40 to a reader 50 and/or a computer 53. Reader 50 may have contacts 54, 55 and 56 which connect to the terminals 46, 47 and 48 of battery 30.

Reader 50 and controller 42 may conduct a hand-shaking routine to induce controller 42 into transmitting the information stored in memory 44. Such a routine could be as simple as pulling up the bias on the line connected to the terminal 47. Controller 42 would sense the bias pull-up and proceed to transmit the information. Preferably, controller 42 conducts a data dump operation, where the information of memory 44 is directly transmitted without further intervention from controller 42. Controller 42 may send the information to reader 50 according to a serial communication scheme. Reader 50 then receives the information, stores it into memory 52 and/or sends it to computer 53 for analysis. Reader 50 may also contain enough memory to store the information downloaded from several tools 40.

In order to provide more accurate use information, it is preferable that memories 25, 33 and 44 are pre-programmed with identification codes or serial numbers that are downloaded by reader 50. Using the pre-programmed identification code, computer 53 can then better analyze the downloaded information by disregarding old information, comparing use between downloads, etc.

Persons skilled in the art will recognize that the use information can also be used to detect instances of abuse.

Persons skilled in the art may recognize other alternatives or additions to the means or steps disclosed herein. However, all these additions and/or alterations are considered to be equivalents of the present invention.

What is claimed is:

1. A charging apparatus for charging a battery comprising:
   a current source for providing current to the battery;
   a controller connected to the battery and to the current source for controlling charging of the battery; and
   a memory connected to the controller for storing use profile information.

2. The apparatus of claim 1, wherein the memory stores use profile information about operation of the charging apparatus.

3. The apparatus of claim 2, wherein the stored information comprises at least one of the group consisting of number of batteries charged, number of batteries of a first type charged, number of batteries of a second type charged, number of times specific charging processes were selected, number of times specific charging termination processes were used, number of times charging process was delayed to allow cooling of the battery, and main voltage.

4. The apparatus of claim 2, wherein the stored information is downloadable.

5. The apparatus of claim 2, wherein the stored information is downloadable into a computer.

6. The apparatus of claim 2, wherein the stored information is downloadable into a reader apparatus.

7. The apparatus of claim 1, wherein the memory stores use profile information about the battery.

8. The apparatus of claim 7, wherein the stored information comprises at least one of the group consisting of battery type, battery capacity, charging process, initial temperature and connection time.

9. The apparatus of claim 7, wherein the stored information is downloadable.

10. The apparatus of claim 7, wherein the stored information is downloadable into a computer.

11. The apparatus of claim 7, wherein the stored information is downloadable into a reader apparatus.

12. The apparatus of claim 1, wherein the memory stores use profile information about battery type.

13. The apparatus of claim 1, wherein the information is download able into a computer.

14. The apparatus of claim 1, wherein the information is downloadable into a reader apparatus.

15. The apparatus of claim 1, wherein the memory is non-volatile.

16. The apparatus of claim 1, wherein the memory comprises an $E^2$PROM memory.

17. A battery comprising:
    a memory for storing use profile information about the battery.

18. The battery of claim 17, wherein the stored information comprises at least one of the group consisting of battery type, battery capacity, charging process, initial temperature and connection time.

19. The battery of claim 17, wherein the information is downloadable.

20. The battery of claim 17, wherein the information is downloadable into a computer.

21. The battery of claim 17, wherein the information is downloadable into a reader apparatus.

22. The battery of claim 17, wherein the memory stores use profile information about initial temperature.

23. The battery of claim 17, wherein the memory is non-volatile.

24. The battery of claim 17, wherein the memory comprises an $E^2$PROM memory.

* * * * *